United States Patent
Reid et al.

(10) Patent No.: US 10,218,575 B2
(45) Date of Patent: Feb. 26, 2019

(54) PROVISION, CONFIGURATION AND USE OF A TELECOMMUNICATIONS NETWORK

(71) Applicant: BAE SYSTEMS plc, London (GB)

(72) Inventors: Iain Norman Nicol Reid, Guildford Surrey (GB); Richard Thomas Jarvis, Guildford Surrey (GB); David Nicholson, Gloucester (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 15/550,293

(22) PCT Filed: Feb. 16, 2016

(86) PCT No.: PCT/GB2016/000034
§ 371 (c)(1),
(2) Date: Aug. 10, 2017

(87) PCT Pub. No.: WO2016/128708
PCT Pub. Date: Aug. 18, 2016

(65) Prior Publication Data
US 2018/0212829 A1    Jul. 26, 2018

(30) Foreign Application Priority Data
Feb. 13, 2015 (GB) .................................. 1502371.6

(51) Int. Cl.
*H04L 12/24* (2006.01)
*H04L 12/26* (2006.01)
*H04L 29/06* (2006.01)

(52) U.S. Cl.
CPC ........ *H04L 41/0883* (2013.01); *H04L 41/142* (2013.01); *H04L 41/147* (2013.01); *H04L 43/04* (2013.01); *H04L 63/1425* (2013.01)

(58) Field of Classification Search
CPC combination set(s) only.
See application file for complete search history.

(56) References Cited

U.S. PATENT DOCUMENTS

2008/0155588 A1* 6/2008 Roberts ................ G06Q 30/00
                                                      725/34
2010/0027432 A1   2/2010 Gopalan et al.
(Continued)

FOREIGN PATENT DOCUMENTS

WO   2016128708 A2   8/2016

OTHER PUBLICATIONS

International Search Report and Written Opinion received for Patent Application No. PCT/GB2016/000034, dated Sep. 16, 2016. 22 pages.
(Continued)

*Primary Examiner* — Faruk Hamza
*Assistant Examiner* — Abusayeed M Haque
(74) *Attorney, Agent, or Firm* — Fitch & Maloney PLLC (57) ABSTRACT

A method of configuring a telecommunications network comprising the steps of:
providing a first set of time dependent network data, a network related parameter varying with time;
identifying abnormalities embedded within said first set of data;
providing a first set of external event data;
associating respective abnormalities with corresponding event data;
generating a model to represent an impact of the, or each, class of event, represented by the event data;
using the, or each, model in combination with extrapolated data to predict future variation in the network related parameter;
repeating this simulation for alternative input conditions;
selecting a solution from the output of one the simulations; and
implementing a modification to the network corresponding to the/or each respective input condition.

3 Claims, 8 Drawing Sheets

(56) References Cited

U.S. PATENT DOCUMENTS

| | | | |
|---|---|---|---|
| 2013/0238534 A1 | 9/2013 | Nagaraj et al. | |
| 2014/0372279 A1* | 12/2014 | Wagner | G06Q 40/04 705/37 |
| 2015/0379430 A1* | 12/2015 | Dirac | G06N 99/005 706/12 |

OTHER PUBLICATIONS

International Preliminary Report on Patentability received for Patent Application No. PCT/GB2016/000034, dated Apr. 20, 2017. 8 pages.
Erman, et al., "Traffic Classification Using Clustering Algorithms," SIGCOMM Workshops, Sep. 11-15, 2006. pp. 281-286.
Kumpulainen, Pekka, "Anomaly Detection for Communication Network Monitoring Applications," URL: https://tutcris.tut.fi/portal/en/publications/anomaly-detection-for-communication-network-monitoring-applications(b7957217-0942-4390-8027-00ae2bebdf00).html. Mar. 19, 2014. 185 pages.

\* cited by examiner

PROVISION, CONFIGURATION AND USE OF A TELECOMMUNICATIONS NETWORK

This invention relates to the provision, configuration and use of a telecommunications network, in particular to configuring the network and clustering entities within the network.

In a network, for example a telecommunications network, large volumes of data are generated continuously. Such availability of apparently relevant data should enable informed decisions about that network to be made quite readily. However, such vast quantities of data can be particularly difficult to handle, and it can be even more difficult to deduce meaningful interpretations thereof which, in turn, makes it difficult to make decisions based on the data.

Within a network, it may be relatively straight forward to detect when a fault occurs, but hard to assess the overall impact of that particular fault on the network to enable replacement/enhancements to the network to be prioritised and optimised.

For a telecommunications network provider it may be easy to establish that users decide to turn elsewhere (churn) but it can be rather harder to detect why they have done so, to enable this issue to be addressed.

A network may experience low performance, low quality service, outages due to faulty hardware. Furthermore, data may be lost, either accidentally or by malicious activities resulting in damage to business critical systems or reputation. Any of these aspects pose a risk that can be mitigated by reconfiguration of the network. The network administrator only has access to finite resource and budget and it can be hard to ascertain the best resource allocation to achieve the most secure outcome.

Some of these issues are addressed/mitigated by implementing the techniques of the present invention.

According to a first aspect of the present invention, there is provided a method of configuring a telecommunications network, the method comprising the steps of:
providing a first set of time dependent network data, a network related parameter varying with time;
identifying abnormalities embedded within said first set of data;
providing a first set of external event data;
associating respective abnormalities with corresponding event data;
generating a model to represent an impact of the, or each, class of event, represented by the event data;
using the, or each, model in combination with extrapolated data to predict future variation in the network related parameter;
repeating this simulation for alternative input conditions;
selecting a solution from the output of one the simulations; and
implementing a modification to the network corresponding to the/or each respective input condition.

According to a second aspect of the present invention, there is provided a computer program which when loaded onto a computer causes it to execute the aforementioned method.

According to a third aspect of the present invention, there is provided method of clustering entities, the method comprising the steps of:
providing a data matrix comprising, for each entity, a plurality of data elements that each represent an attribute of the entity;
defining a judgement parameter by which to appraise the entities;
ascertaining a relationship between each attribute and the judging parameter;
generating a weighting factor to be applied to each data element to yield a measure of the correlation of the element to the parameter; and
clustering the entities, based on the correlation, into a number of discretised groups.

Each entity may be a user of a network or a component of the network. The groups may be used to inform subsequent decisions about reconfiguring the network. The relationship may be a non-linear relationship. The learning/ascertaining step and the generating steps may be carried out using the randomised dependence coefficient (RDC) technique. After the generating step there may be a human review step when the weighting factors are biased by the human to allow domain expertise to be incorporated into the method.

The clustering step may be carried out using the k-means approach. Some of the elements may be numerical and others are categorical. Categorical elements may be converted into binary information before the ascertaining step.

The method may synthesise one or more new attributes by mathematically combining original ones.

According to a further aspect of the present invention, there is provided a computer program which when loaded onto a computer causes it to execute any of the aforementioned methods.

DESCRIPTION

A network, of the type referred to hereafter, comprises a large physical collection of nodes, or network elements, that provide telecommunication services for users. The network may be a country-wide radio based mobile telephone network such as a commercial communication service provider (CSP), a large WAN, or a country-wide TV network with asynchronous communication (download=satellite, upload=internet).

A population of users (generally in the millions) connect to these network elements and send data across the network, either to/from each other or to/from other services hosted on the network. Each and every time data is submitted to or transmitted by the network, transactional data is generated. Consequently, vast quantities of data may be captured.

Conventionally, manipulation of so called "big data" tends to be concerned with the challenges associated with handling the data and processing of the data tends to be restricted to the content of the data set itself to determine trends represented within the data. Given the enormous amount and resolution of data available, these trends are regarded as being of particularly high quality and represent a robust way of establishing future possible outcomes via extrapolation thereof. However, since such extrapolations are generally based solely on limited historic time series data that has already occurred, they represent quite an artificial scenario of a future point in time.

In order to provide better, more accurate, information upon which to make decisions about, e.g. the configuration of a system, it is beneficial to make any predictions upon which the decisions are made, as realistic as possible. So in contrast, in using the techniques outlined here, different types of data other than historic time series data are studied in combination.

Figure 1:
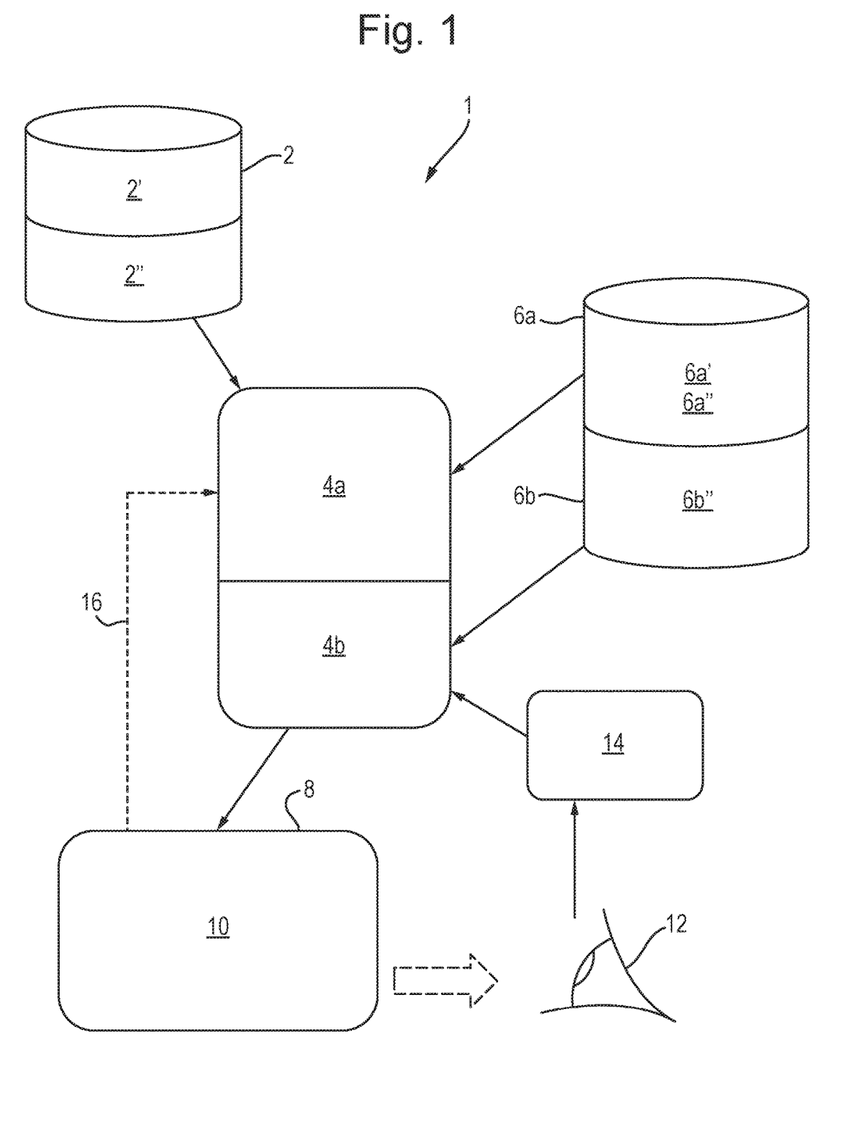
FIG. 1 illustrates a system.

FIG. 1 illustrates a system 1, according to an embodiment of the present invention, for identifying, describing and predicting the behaviours or activities of a network and users of the network for generating data for use in determining requirements for network provision, configuration and preferred use of the network. The system 1 comprises, or has access to, two data stores.

The first data store 2 is generally hosted by the network owner or administrator and provides internal, data. This internal data may represent time series data 2' pertaining to different aspects of use of or activity undertaken by a network. Examples of such time series data 2' are usage data and network performance data:—

Usage records are the set of all records that define the activity of a given customer or subscriber on the network (e.g. mobile phone call data records, internet records, NAT records, etc).

Network performance records are the equivalent of usage records, but for the activity of the network elements (e.g. network element load, failures, coverage changes etc)

Furthermore, the internal data may comprise time independent data 2", Examples of such time independent internal data 2" are subscriber data, financial data and network topology data.

Subscriber data represents information about the users of the network. Data is structured in a data matrix with each row representing a single user each having many attributes representing everything that is known about the user. Each attribute is assigned to a column in the data matrix.

Financial data represents information about financial transactions, both by users of the network and the network owner. For instance, if a subscription model is required to use the network (eg, a mobile phone contract) and this is paid for by a user, then this information would appear here. Likewise if the network is expanded, and new network elements are purchased by network owners, then this information would appear here Network topology data describes the structure and characteristics of the physical network The second data store 6 provides external data. External data may represent world data 6', which is static information that tends to change very little and infrequently, for example geographic data, demographic data, device specifications, phonebook, website categories.

Geographic data may comprise road data, boundaries for mountainous or other types of terrain, boundaries defining urban or rural areas, railway stations, airports, cinemas and other points of interest Demographic data comprises information about people, these people may be users or non-users, it may be census data for the country showing age ranges within geographic areas, average salaries, nationalities, family sizes etc.

Device specifications represent information about the devices that the users use to connect to the network. If the network is a mobile phone network then this may include the phone specifications, handset sizes, battery life, handset images etc.

Phonebook represents a list of known communication IDs, such that communications events off-network may be correlated to off network users. In the mobile phone example then this is phone numbers, however, it may be non-phone related communication IDs such as IP addresses etc.

Website categories is a library of website information that can be correlated against communication events that involve websites.

Additionally, external data also comprises dynamic event data 6", this type of data occurs frequently and tends to represent point-in-time occurrences, for example national holidays, news events, sporting fixtures, TV and radio listings, film releases or other entertainment events, device release or upgrade dates, weather, competitor events such as special offers, availability information (closures of roads or public buildings) etc.

By considering such a significant breadth of information a realistic, comprehensive result with far less reliance on assumptions can be established.

The external data, in particular the event data may be further defined as historic data 6a", for data having been accumulated up to the present time (e.g. last week's TV listings) and future data 6b", for data that has not, as yet, been generated/experienced (e.g. next week's TV listings).

The apparatus 1 is configured such that data from the first and second data stores 2, 6, can be received by a modelling module 4. Modelling module 4 is notionally split into two portions, an historical modelling portion 4a and a predictive modelling portion 4b. Internal data and historic data 6a being provided to the historical modelling portion 4a and future data 6b being provided to the predictive modelling portion 4b.

Output 8 from the modelling module 4 is transmitted to output module 10 for viewing and interpretation by a user 12 of the apparatus 1. The user 12 may provide further input to the modelling module 4 via selection module 14 to effect changes to predictive data generated by the predictive modelling portion 4b as described in detail below.

The output module 10 is, optionally, provided with a return connection to modelling module 4 to provide a feedback loop 16, whereby, information may be routed back to further enhance the output.

Figure 2:
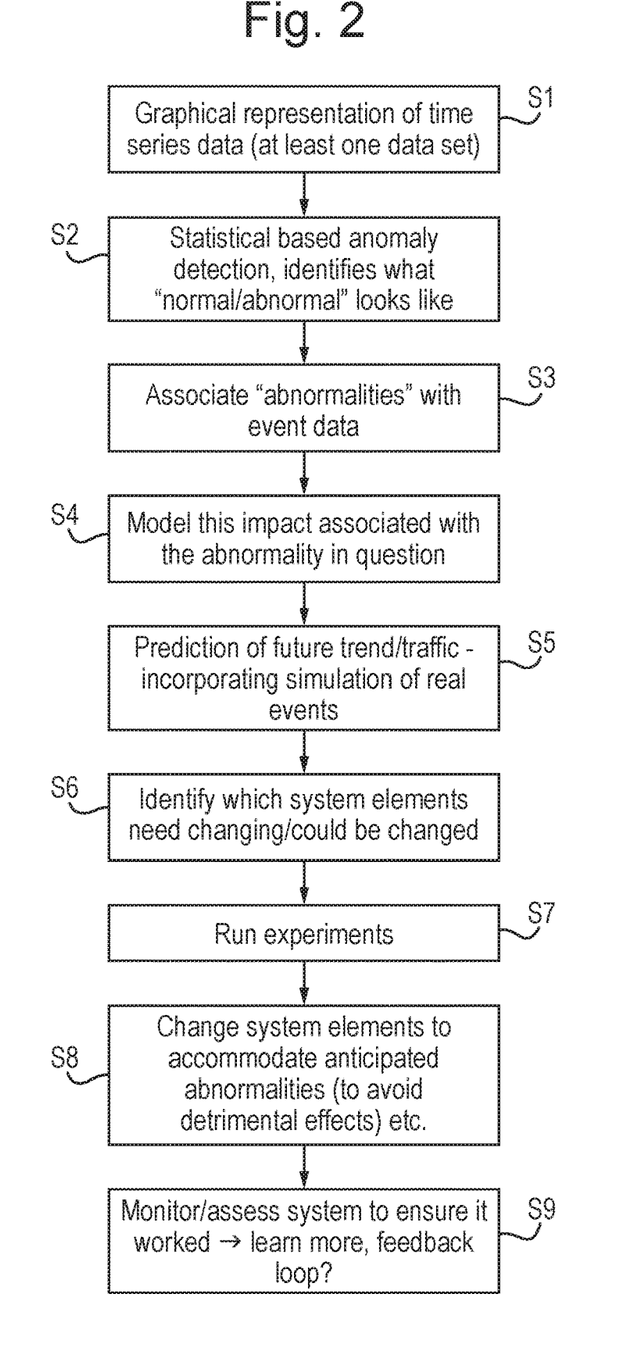
FIG. 2 illustrates a flow chart describing the system.

In FIG. 2 an overview of a process for identifying, describing and predicting the behaviours of a network and users of the network is provided.

Understanding of these behaviours can be used to generate data for use in determining requirements for network provision, configuration and preferred use of the network.

At step S1 time series data, hereinafter referred to as the data 2', is retrieved and submitted to the modelling module 4 for review and assessment. The time varying data fluctuates over time describing peaks and troughs. The data 2' is analysed (step S2) using a machine learning technique, in this embodiment, a statistical based anomaly detection technique that employs the Poisson mixture model of the data. The technique is able to determine how "normal" data is represented and also, therefore, what constitutes "abnormal" data. Abnormal data may be represented by deviations in the time dependent data with respect to a "normal" bulk fluctuation in that data. Such deviations in the data are recognised and identified as being outside some predefined variation in the data and each represents an anomaly of some sort therein.

The machine learning technique used is an unsupervised learning method, i.e. no human intervention is required beyond provision of the input time dependent data.

The time dependent data 2' can be partitioned such that it represents a particular sector, for example a geographical area. When running "training" scenarios, to enable the machine learning technique to establish its base line, the data is partitioned like this to enable a manageable and meaningful portion of data to be reviewed in combination with additional data, in this example, external data representing events 6". This event data is used in step S3 to explain or validate the presence of certain anomalies or fluctuations in the data 2'.

It then becomes possible to be able to quantify the impact of certain historical external event data 6a" relative to the time series data 2' using the machine learning technique (step S4). In so doing, it is possible to represent such a fluctuation or deviation in future, predicted data in reaction to an anticipated presence of similar events 6b'. Incorporating such fluctuations into the prediction of the time series data 8, at step S5, results in a more realistic representation of the future world scenario.

In order to contribute to the decision making relating to resource allocation and reconfiguration of the network or system, it is desirable to provide a clear, realistic indication of likely future demand on the system. This contribution can be further supplemented by establishing how that demand might be affected given different starting circumstances or boundary conditions. In step S6, consideration is given to those elements of the system that are able to be modified. Modification of which may lead to a different future outcome.

A number of such modifications can be considered and simulations undertaken (step S7) to result in a multiplicity of outcomes, this is subsequently referred to this as "running experiments". Depending on the criteria by which such outcomes are judged, an optimum solution can be determined and implemented by reconfiguring the system to reflect the options selected (step S8) to enhance the performance (or whatever parameter is to be improved) of the system.

At step S9 the future performance of the system is monitored over time and compared with the prediction. Thus the model can be validated and any deviation from the anticipated behaviour can be fed back 16 into the analytical module 4 to allow the machine learning and therefore the accuracy of the model to be further enhanced (for next time).

In a first embodiment, the time series data tracks the performance, availability of and/or loading on different elements in a network in order to achieve a dynamic indication of the "health" of the network. The event data in this scenario is a time-series of the number of packets or bytes of traffic on the network. This is expected to vary normally over time with the normal "pattern of life" on a network. However, abnormal deviations are also expected as the network degrades or suffers expected or unexpected outages.

The impact of reduced availability of certain elements of the network on the performance of the network can be determined such that these can be addressed before deterioration becomes critical. The deterioration can be anticipated through monitoring. Peak performance can be optimised through the allocation of limited resources.

In a second embodiment it is how the user experiences the network that is to be the focus.

To give an example of the process at steps S2 & S3, the sector chosen may encompass a geographical area or region surrounding a particular sports venue. It has been found that fluctuations/variations in network traffic/observed activity in this geographical area echo/reflect the schedule of fixtures at that sports venue as represented in external events data. Similarly, it has been found that variations in local network traffic can be associated with the timetable of cultural events held at a particular concert venue.

For example, if network traffic were likely to peak such that network performance would be stretched or otherwise detrimentally affected by certain external events, especially say in light of certain hardware outages/faults, it could prove useful to be able to introduce additional temporary mobile assets to the area. The costs and benefits of doing this can be directly compared to the costs and benefits of providing a permanent enhancement to the network at this particular location.

By having a prediction tool that accommodates realistic input data as boundary conditions to the model, multiple scenarios are able to be simulated from different starting conditions. Alternative potential solutions can thus be modelled and the optimal outcome selected and implemented.

In a third embodiment, risks to the network are addressed. Network providers are exposed to risk when their customers' network experience suffers due to poor network performance (slow, intermittent, outages etc). Historical data sets exist containing previous incidents of such performance failures. Big data analytics can be applied to this data to mine information that can be used to prepare network providers for similar events in future. While the events may not be preventable, resources and manpower can be deployed in advance of the events to improve the customers experience.

Analytics

Figure 3:
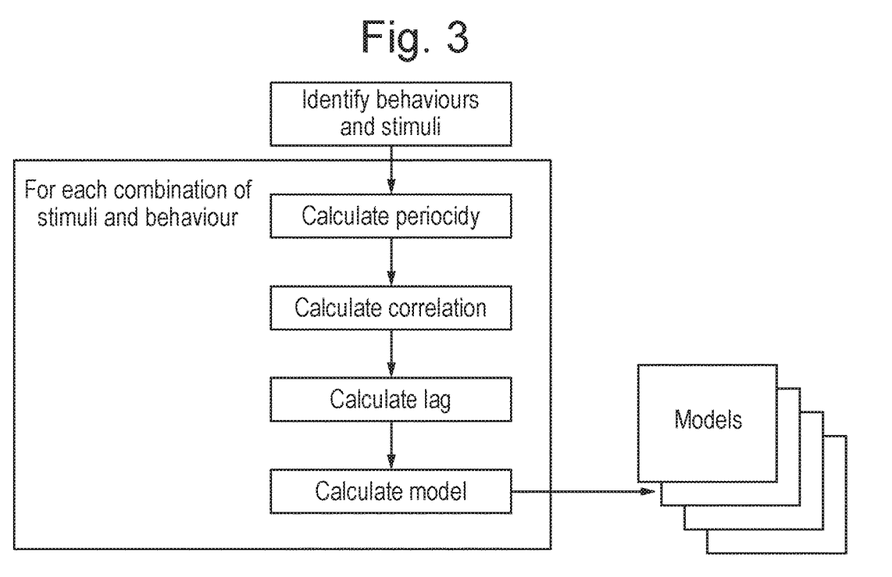
FIGS. 3 to 8 illustrate aspects of the analytical and simulation parts of the system.

Models for updating a base world state are generated by combining a series of correlation functions between stimuli and behaviour as set out below. The sub-steps in this approach are illustrated in FIG. 3

All of the data recognised previously as attributes are used as stimuli, and the actions of a user or network are recognised as their behaviours. Some items can be classified as both stimuli and behaviours; in fact this is true for many of the behaviours, for example, network usage.

A model to map every stimuli onto every behaviour. For example, considering the following stimuli categories—Sporting Events, Network Usage, Website Categories, and Locations, and the following behaviours Device (handset) Choice, Network Usage, Location, the following model categories can be produced:

Sporting Events→Network Usage
Sporting Events→Locations
Sporting Events→Device Choice
Network Usage→Network Usage
Network Usage→Locations
Network Usage→Device Choice
Website Categories→Network Usage
Website Categories→Locations
Website Categories→Device Choice
Locations→Network Usage
Locations→Locations
Locations→Device Choice Within each model category, separate models are generated for each data series, within each stimuli. For instance, within Sporting Events, the events are classified using various tags, such as #football, #cricket, #manchester_united, #premiership, #ashes etc. (Each event can contain more than one tag). The actual models are based on the classification of these tags as data series, rather than all the sporting events joined together. So, for instance, the "Sporting Events→Network Usage" model category, would comprise:

football→Network Usage
cricket→Network Usage manchester_united→Network Usage
premiership→Network Usage
ashes→Network Usage
etc. . . .

Each model category, potentially, comprises many thousands of models, and each data point within each category is, potentially, considered across multiple stimuli.

Each stimuli can be considered as a discrete series of all events that match that exact model. For instance, the #football series (in Sporting Events) would be the series of all Sporting Events data points that carried the #football tag. All series are mapped over time.

People make calls in a given location in a repeating pattern.

News events are stored with a decay function as they are considered to have a persistent decaying effect on the world. The equivalent function for a Sports Event would be a box-like shape marking the event's start and end.

Once a large number of data series have been identified (both stimuli and behaviors), the periocidy of these series are calculated using an autocorrelation function, followed by double-differentiation.

Once periocides have been identified, the stimuli series can be compared with the behavioural series to determine any changes in the median over specific time periods, and verify if there is any correlation between these changes. At this point a fit in either direction, without respect to time can be carried out.

The final part in the model building is the addition of lag timing, to match up the time differences in any correlation events.

The deviation from the normal is calculated. Then cross correlation function is used to give a view of the level of fit depending on the lag.

The model is then updated to take account of this lag calculation

Using the above approach in an iterated way (over every possible stimuli and behaviour) produces a set of many thousands of models. These models are then classified according to the Simulation aspect that they apply to and form the input to the simulation step.

Simulation

Different factions approach a problem from differing perspectives and may consider a solution to be determined without recognising potentially detrimental effects on other parts of the network—even if these ultimately impact their own solution. Such can be the limitations of running localised simulations without considering the wider network.

Consider the example of a network planner and a pricing manager working separately, both running localised simulations. The network planner is running a simulation to see how the network traffic behaves, and the pricing manager is running a simulation to see how people behave. A solution that only looks at these two domains might conclude:

Pricing Manager: My simulation shows that if I decrease the price of using the network, we attract more users to the network. As my goal is to increase the number of users on the network, this is a good thing.

What actually happens: More people join the network, but become frustrated that the network cannot keep up with the additional traffic, and so leave shortly after. By leaving, they cause others to leave too, and the overall numbers of users on the network actually drops.

Network Manager: My simulation shows that certain types of traffic are causing congestion in certain places of the network. Therefore if I increase the price of that types of traffic, that area will become less congested, and the overall number of failures on the network will go down. As my goal is to reduce the number of network failures, this is a good thing.

What actually happens: People stop using that type of traffic, but as they still have a desire to complete that communication, they switch to a different type of traffic in order to meet that need. This causes congestion in other parts of the network and the number of network failures actually goes up.

In both cases, localised simulation has not taken into account side-effects of the proposed action. The pricing manager's simulation did not take into account the increase in network traffic and what effect that would have on the users he was trying to simulate, and the network planner's simulation did not take into account the needs of the users and what effect that would have on the network traffic he was trying to simulate.

To address these scenarios more comprehensively, a holistic approach to simulation can be used, whereby the whole subscriber and network landscape is evaluated for side effects.

Figure 4:
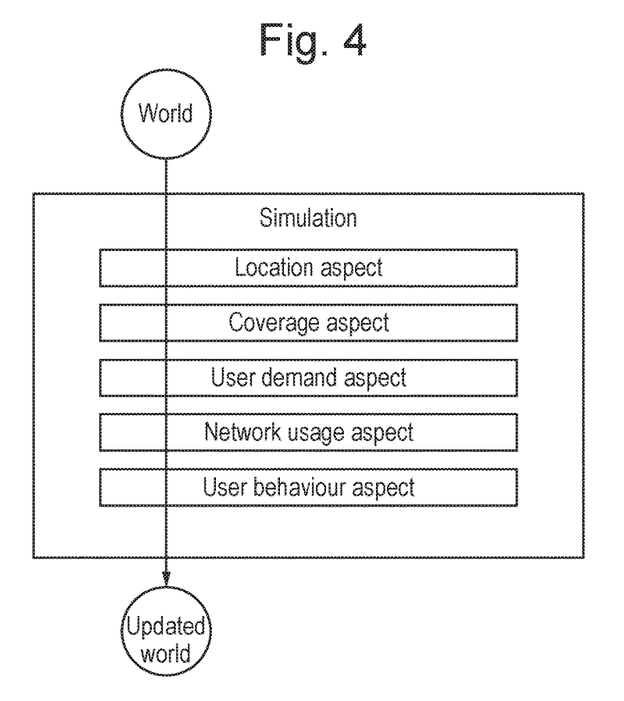

FIG. 4 illustrates how the landscape can be broken down into a series of layers, called aspects, that each simulate different slices of the full problem.

The location aspect simulates the movement of all network users at all times. Location points are known (within error) when the user connects to the network to perform some usage (typically a call). Patterns of these, along with external data such as road networks, can be used to estimate locations when the user is "offline".

The coverage aspect simulates the geographic coverage of the radio networks (eg, 2G, 3G, 4G etc), highlighting black spots of coverage for each channel. This is not a fixed coverage, but rather, across time. For instance, in times of congestion or network faults, coverage may be reduced.

The user demand aspect simulates the desire of people to use the network and the ways in which they want to use it. For instance, making calls, downloading videos, etc, as well as who they would be making calls with.

The network usage aspect simulates the traffic that flows over the network, including routing of traffic and eventual delivery to the users, call completion or dropout, etc. Performance degradation on network elements, failure rate, and other non-traffic elements of the network are also simulated.

The user behaviour aspect simulates the long-term actions of subscribers. For instance, joining or leaving the network, handset or tariff upgrades, as well as various social and geographical behaviours like friendship groups, moving house, etc.

Figure 5:
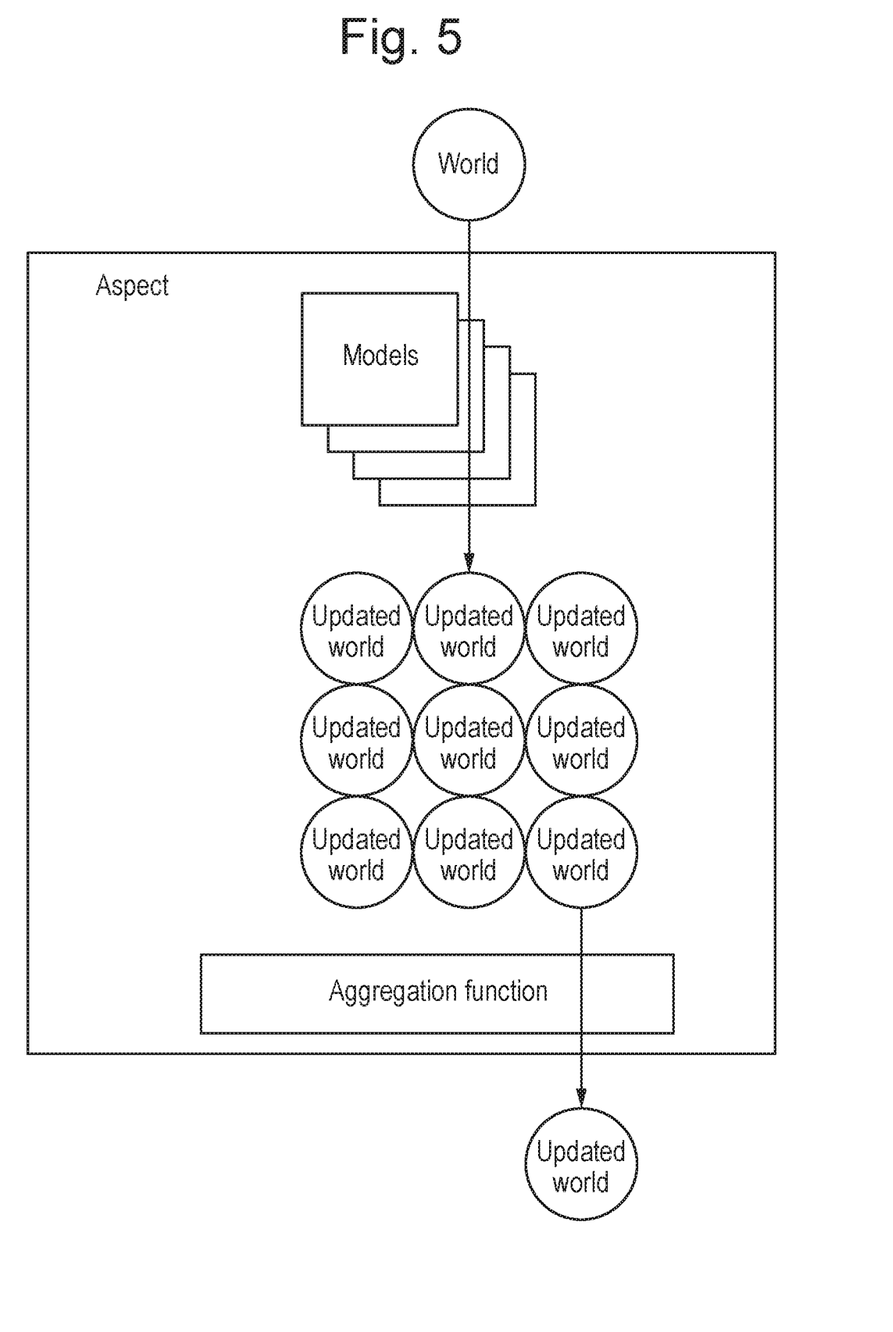

All of these aspects are simulated across the whole customer and network landscape at once over real (pseudo-anonymised) customer records FIG. 5 shows the process for simulation over a given aspect. A starting world describes everything known about the network and users at a given point in time. This is known data, either obtained directly from the network or simulated data received from one or more previously simulated aspects.

A set of Monte-Carlo models describe how to advance the world one "time step" in the current aspect. The duration of the time step varies depending on the aspect under consideration, for network usage the time step may be a single second, whereas for user behaviour the associated time step might be a day or more. The Monte-Carlo models describe the world change in terms of percentage likelihoods for given actions. For instance, a rule in the Monte-Carlo models for user-demand might say something like:

"If it is a weekday, and a user is at work, and works in a clerical job, then for any given hour they have an 80% chance phone one of their work colleagues".

After iterating through a predetermined number of steps, a new simulated world results. However, due to the probabilistic nature of the Monte-Carlos models, this new simulated world represents only one possible outcome. To get a more accurate understanding, the simulation is repeated a number of times (depending on the number of models involved, this can be many 1000s of times), and the resulting set of different possible updated worlds are then aggregated using a fixed aspect-specific aggregation function to determine the "most likely world".

It is important to note that the aggregation function does not just look for the most common occurrence of each item in the world, and make a selection on that basis. To do so, would miss overall trends in favour of the "tyranny of the majority". For instance, if the conclusion of the simulation was that there was an 80% (highly-likely) chance of a network failure in a random location across the country, then although most of the simulations would show a network failure somewhere, each location will only have a very small number of worlds that have that network failure. Therefore, if the aggregation function just combined reports from each location, the network failure would not be preserved. Instead, overall trends on aspect-specific patterns must be considered, in this case looking at failures anywhere on the network, and ensure that these are preserved in the overall "most likely world".

In order to articulate this model, many things must be known about the user:

Whether it is a weekday or not, and what time it is in the current world.
What job the user works in
Whether the user is at work or not
Who the user's work colleagues are These facts are all part of the world state, and either exist directly within the data, or are calculated by other simulation steps (such as the location aspect in the case of where the user is, and the user behaviour aspect in the case of the user's work colleague friendship group).

However given all these facts, and the rule in the model, calculating whether the user makes a call or not is therefore just a case of applying the percentage chance (80% in this case), like rolling a die. Any given Monte-Carlo model for a given aspect might contain 1000s of these rules, all of which are evaluated for each time step.

The actual execution of simulation is a complex distributed process, and the sheer scale of both the world (10s of millions of subscribers, and their locations and behaviours), along with the wide-ranging models means there is a high amount of computation required. This is handled through a distributed processing model as shown FIG. 6. The world is divided into discrete chunks through a divider-combiner function and passed to processing nodes. As the state of the whole world is considered at each time step, these world updates are fed back through the divider-combiner function so that the unified world is updated at each and every time point.

Figure 6:
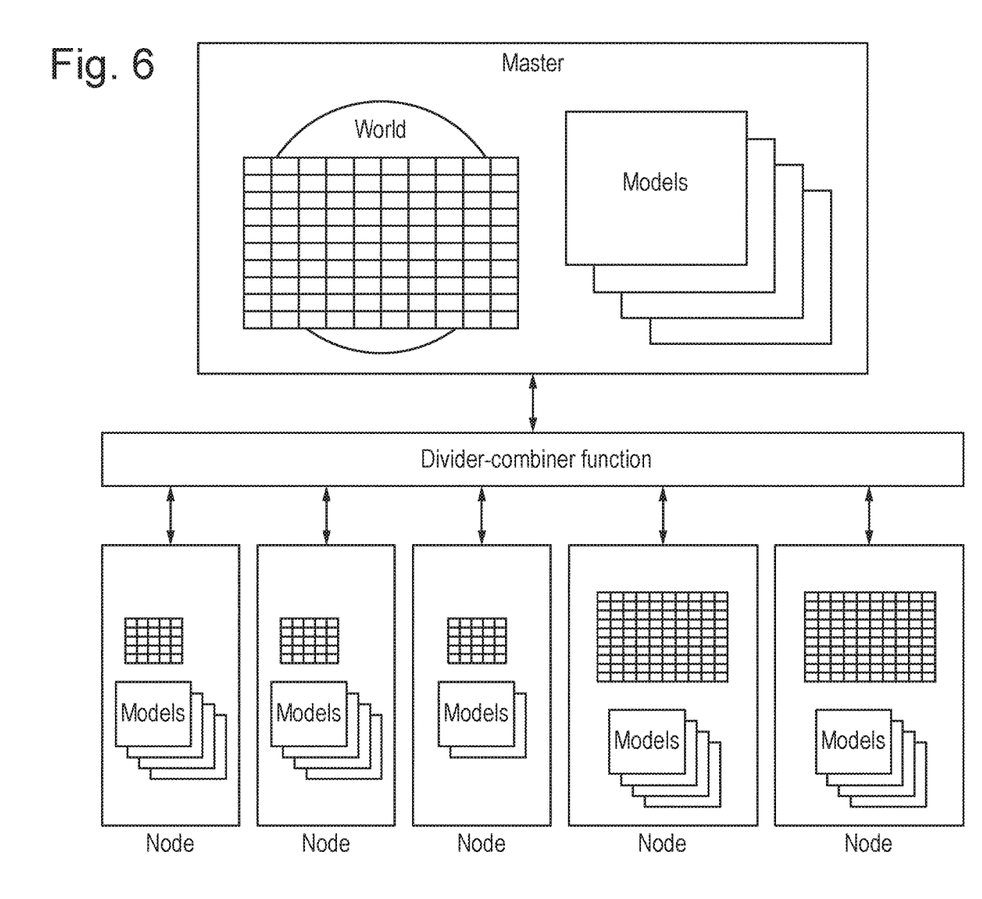

Note that, as shown in the above, there are different ways that this processing may be divided. The divider-combiner function sends different chunks of the world to separate processing nodes so that processing of multiple models can be split, or it can split models between nodes, or some combination of both. The models and the world both contain metadata describing legal ways that they can be split, so the divider-combiner function can optimise itself on-the-fly for a previously unknown set of simulations.

The simulation as described so far enables predictions to be made i.e. the likelihood that a certain scenario will come about but does not address the possibility of what could occur in the future, referred to as prescriptive analytics.

The descriptive nature of the aforementioned aspects and of the Monte-Carlo models has the advantage of making the output of the updated worlds completely explainable in terms of cause and effect.

For instance, the behavioural aspect simulator might predict that a certain user ("John") is likely to leave the network. The simulator can then say:

The behavioural aspect would show that this is because of a large number of dropped calls, both ones that are known about and others that are likely to occur, and slow download rates for content in which John is particularly interested.
The network aspect might show the sorts of times and places where he has (or will) experience the dropped calls or slow download rates.
The user demand aspect shows what content John has been trying to view (sports streaming in this case), along with his expected level of service.
The network coverage aspect shows what nodes were flagged as being out of service at the relevant times.

Although this can be shown on a per-user level, it is most valuable when pooled to show detail across a group of users. Additionally, due to the probabilistic nature of the modelling, it is also most accurate when pooled in this way. The system is not necessarily optimised at finding precise models to describe customer activity at an individual user level, and by reporting that John is likely to leave the network, this is only a best guess. However, if in the above example, there were 1000 users that were similar to John, the confidence level that some of them would leave the network (and how many) would be greatly increased.

One of the central advantages to using explicitly encoded models on a discretely modelled world is that it allows changes in the world to be used to test different starting conditions. In other words, we can test what could happen as well as what will happen.

Figure 7:
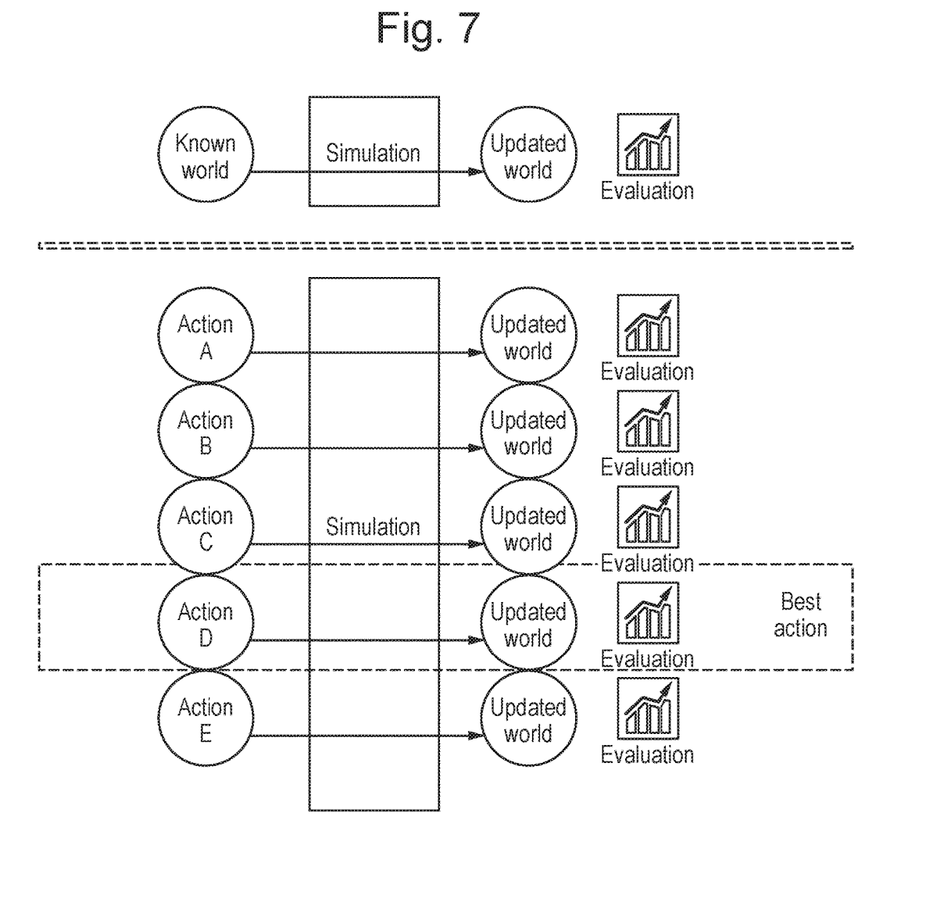

Consider a situation of rising churn among a key segment of users. The system predicts this fact, and knows that this will be caused by call failure rates, poor download experience, failed customer-service resolution and unhappiness with tariff charges. All these facts are descriptive/predictive and all are captured in the discrete world modelling simulation as described previously. We can then re-run the simulation with different starting conditions, for instance:

Increased coverage in key areas corresponding to the chosen user segment (i.e. some network planning is conducted and these users are targeted for service improvements)
Increased download capacity for those users (again, through planning investment)
Alternate download options, either through making WiFi available in key locations (home, public spaces) or offering tariff incentives to offload data onto WiFi
Increased customer service resolution to these customers FIG. 7 illustrates a set of actions the business could take to try and prevent the churn on the highlighted users. Each of these solutions can be modelled separately in a new starting world, and the overall simulation re-run. This is referred to as an experiment. Running separate experiments for different possible actions, allows the individual effect that each of these actions will have to be predicted. Some actions might result in a better outcome for the users in question but have an adverse effect on other users. Whilst others might have little positive impact on the users in question; the actions that provide the optimum outcome overall are revealed by the experiment.

Additionally, it is possible to tie the experiment results to overall resource efficiency. Not all the actions have the same impact on a limited set of resources, installing new radio masts is, potentially a much more significant undertaking than configuration changes to existing ones. This can be taken into account, and the overall network benefit/value of the actions evaluated along with their actual effect.

Thus network management decisions can be informed/supported by the system of the present invention to enhance flexibility, confidence and efficiencies to be achieved based on experiment outcome.

Figure 8:
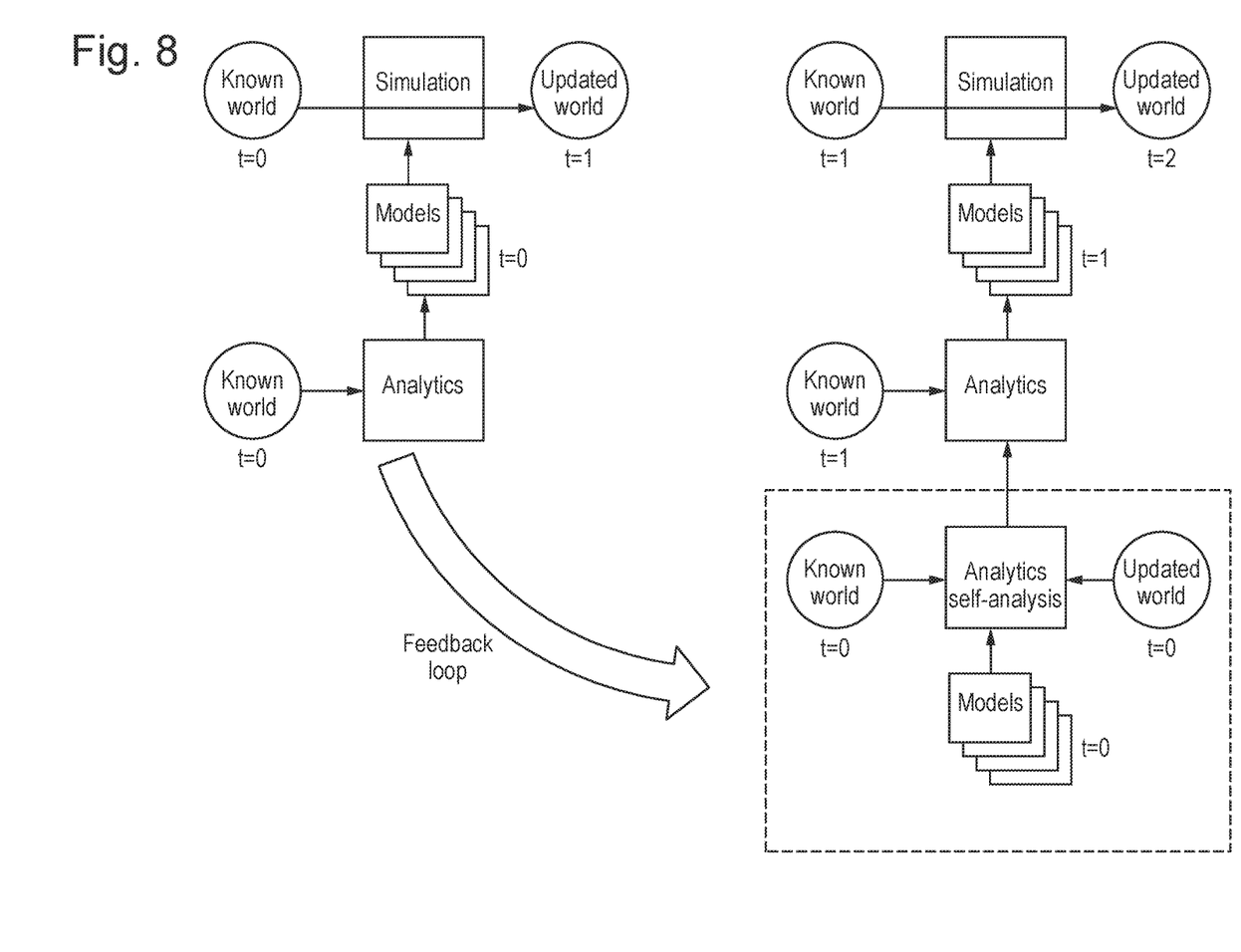

FIG. 8 illustrates self-training of the analytical models via simulation. The analytical models are a key part in the simulation approach, as they define how the world evolves over time. Therefore, the accuracy of these models determines the accuracy of the whole simulation approach.

Model training is a combination of both initial human-driven routines and self-learning analytics based on evaluation of models from a previous time step.

Conventional approaches to prescriptive analytics involve a constant human-and-machine approach, where users manually evaluate the outcome of each model and hand-train at each step. Whilst that is not the case in this system, there is still value in incorporating some human-driven initial learning in order to encode domain-specific knowledge in the models. Such as:—
people sleep for (on average) 10 hours per day
people don't make phone calls when they are asleep
people normally sleep where they live This input allows the location models to accurately predict the home location of most individuals, but the three facts encoded above are "knowledge-based" facts that are not present in the data. An entirely data driven approach would miss out on heuristics such as these.

The second part of the model training, and the largest part, is data-driven self-learning techniques that analyse the patterns in the data. For instance, the data might show (and typically does) that people make less phone calls across the country on public holidays. This fact, along with the percentage drop as affecting different parts of the country, is entirely learned from the data by analysing previous patterns using a standard supervised machine learning technique.

Therefore, the base set of models (at time t=0 in FIG. 8), contain a combination of human-derived facts and training that is based on a historic data set (say six months). These models are passed into the simulation engine, and are used to generate an "Updated World", as described above, as represented in FIG. 8

In processing huge amounts of user related data, there is a challenge in distilling the processed information into a meaningful (to a human) form such that it is possible to use/interpret the output. To provide data that is more meaningful, it can be sliced in such a way that each portion is restricted to representing a cluster of users. In so doing, the results for one cluster can be compared to that of another and the impact of different actions on different clusters can be determined. It then becomes increasingly possible to interpret the data in a relevant way to form decisions based thereon and, subsequently, manipulate and reconfigure the network in an optimal/improved manner. Clustering forms discretised groups or segments of users and is based on matching similar behaviours or characteristics between these users in a meaningful way. Thus the users can be treated in bulk as an entire group (therefore efficiently) whilst retaining relevance to each individual.

Figure 9:
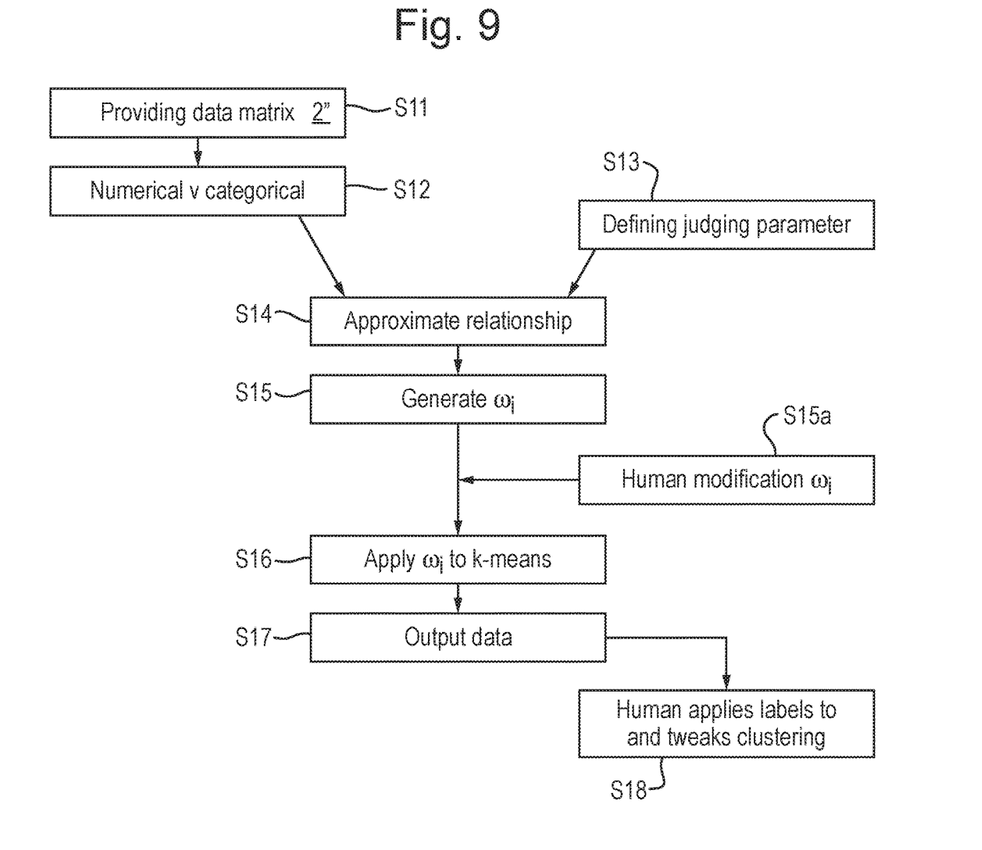
FIG. 9 illustrates a flow chart of the clustering method.

Referring to FIG. 9, clustering is based on time independent internal data 2" provided in step S11, say the data matrix of Subscriber Data. Each row represents a single user, each having many attributes representing everything that is known about the user. Each attribute is assigned to a column in the data matrix.

Each group or segment is defined as a subset of the total user population such that the sum of all segments adds up to the total population exactly. Each user in the population is in exactly one segment (no more, no less) and users within a segment are all similar, in some manner.

Similarity between a group of people can be defined as the average "distance" between any two people. Therefore, to define similarity, we need only define a distance measure between any two people, or, to summarise, to describe how similar a group of people are to each other, we only need a method of describing how similar two people are to each other.

Any one attribute may be represented by numerical values or categorical values. Numerical values are any value that can be represented as a single real number, for example
straight numbers (average number of calls per day)
values that can be encoded as a number (date of birth—commonly represented as the number of seconds since fixed epoch)
multi-dimensional numbers, broken down into a single dimension (a geographic location, which can be broken down into latitude and longitude)

Numerical values are additive, i.e. if the difference between a and b is x and the difference between b and c is y, then the difference between a and c is (x+y).

In contrast, categorical values are any values that are not additive, generally represented as a string. Even if such strings were encoded as a numeric, the underlying field is not additive, and so they cannot be considered to be a numeric field. For instance, if there was a categorical field called "Handset type" that could be of three distinct values ["Brand A", "Brand B", "Brand C"] and the distance between "Brand A" and "Brand B" is x, and the distance between "Brand B" and "Brand C" is y, it does not make sense to say that the distance between "Brand A" and "Brand C" is x+y, even if the strings were encoded. In the example here, the field only has three different categories all of which are known in advance, but categorical fields can have an unlimited number of values, which do not need to be predefined. Name is a good example of this; it is not feasible to provide a list of all possible names, as even with a national census, new names are generated between census points and people with new, unique names move from foreign countries, etc.

Numerical and categorical attributes are treated separately and the total distance between two users is the sum of the distance of their two field types.

If there are n numerical attributes, these can be considered to be a point in n-dimensional Euclidean space. The distance between two points can therefore be determined as the vector distance between these points. However, given that some numeric values are likely to be a small (e.g. in the range 0-1) and some are likely to be large (e.g. 1'000'000) it is necessary to normalise these numbers before performing vector calculations so that all fields are treated equally. This can be done using z-normalisation across the whole population for all numeric fields, which alters both the mean and standard deviation of each numeric field to 1.

The categorical attributes must be treated slightly differently. Instead of Euclidean space, a Categorical space is defined, such that any two points (within the attribute) that differ in this space have a distance of exactly 1. The total distance between two sets of categorical data is therefore the total number of categorical fields that differ. This can be considered to be the same as a Hamming distance between two categorical sets of fields, where each field value is just a different symbol in an "encoded string" that represents the categorical fields.

The attributes are pre-processed as described above in step 12 of the process outlined in FIG. 9.

It is possible to cluster the user information in various ways based on the attributes of the internal data using a parameter that is recognised as being of interest. Selecting this parameter (step S13) is a decision to be made based on the desired outcome to be achieved. If, for example the aim is to maximise value to the owner of the network, a judging parameter that represents the revenue represented by the user might be selected. If, alternatively, it is desirable to minimise risk to security of data retained on the network, an alternative measure that represents this risk may be appropriate.

A machine learning technique is used at step S14 to determine a relationship between each attribute and the selected judging parameter. This relationship will generally be a complex non-linear relationship. Each entry in the data-matrix 2", for each attribute, is then revisited and cross-correlated to the judging parameter. Thus appropriate weighting factors are generated at step S15, for use in the subsequent clustering process (step S16), representative of the bearing each attribute has in relation to the desired outcome. The randomised dependence coefficient (RDC) technique has been implemented to determine the relationships between the attributes and the judging parameter(s) (S14) and to carry out the cross-correlation that generates the weighing factors (S15).

Thus the data is intelligently pre-processed before being fed into the clustering process at step S16. The clustering process implements the k-means algorithm to quantify the aforementioned distance measure between users to judge that they are "similar" such that they can be clustered together.

However, the standard k-means algorithm needs to be modified in two aspects to cope with a distance measure of the type described above. Firstly, k-means only deals with Euclidean distance and, secondly, k-means needs the notion of a centroid, i.e. a point in the space that represents the centre of a set.

Both aspects encounter the same challenge, namely that we are dealing with a set of points that exist in two separate geometric spaces. The solution to this is to expand the notion of Categorical space above to allow centroid points to exist in between two symbols. For instance, we could define a centroid point for "Handset type" as 0.6 "Brand A", 0.2 "Brand B" and 0.2 "Brand C". This expands the notion of Hamming distance to include fuzzy set membership of the different symbols. For normalisation purposes, we make the total fuzzy set membership add up to 1.

The centroid measurement in the k-means algorithm can, thus, move in non-discrete terms. The k-means can be further modified to allow for multiple geometric spaces and use it to generate different clustering solutions.

Thus clustering is undertaken with little human input, one or more solutions are provided. However, once these solutions are reviewed, it may become apparent, given the domain expertise of the human, that some additional bias could/should be included. This can be achieved directly by human intervention in further biasing the weighting factors $\omega_i$ at step S15a. Furthermore, once the proposed clustering solution is output at step s17 labelling of these clusters is provided by a human operator and acceptance or further refining of the clustering can be effected at this stage. Overall, this results in a balanced contribution to decision making between machine learning and the human input to exploit domain expertise of the latter.

Whilst a large number of attributes are represented in the original data matrix, it may be desirable to take this base set of attributes and generate or synthesise new ones by combining some of them using simple mathematics, thus the base data can be "enriched". To provide a different basis/perspective from which to segment the users. For example an attribute from the original data matrix may be the number of international calls made by the user in a particular month of operation. It may be more useful to modify this data by representing it as number of international calls made by the user that month divided by number of international calls made by all customers (or their average) in the same month number of international calls made by the user that month divided by number of calls made by the user in the previous month number of international calls made by the user that month divided by number of non-international calls made by the user in that month Clustering is performed in very high dimensional space as the data relating to all users is retained and then slice through data at the end To address inadequacies in a system by reallocating particular resources/indicating how particular resources might be best reallocated for optimum performance of that system. Clustering enables changes to be made as required rather than on a whole scale/macro basis If the decisions to be made about reconfiguration of the network are not directly based on or influenced by the impact on the users but, rather, relate more to the optimisation of the network in its own right, it may be more pertinent to use the Network Topology internal data 2" rather than the Subscriber Data, upon which to perform clustering/segmentation.

In any particular network many (thousands of) network elements will be present. Many usage records (millions, or even billions) are associated with each network element, together with significant quantities of auxiliary data. Presenting aggregated information about network elements that are similar to one another (i.e. clustering) enables human-readable information about the network and its users to be provided.

Consequently, in a similar manner to that described above, network elements can be grouped together into clusters/segments that contain similar elements. Element similarity is defined by a distance function that combines Euclidean distance over numerical fields along with fuzzy set membership distance over categorical fields. A modified K-means algorithm is used to optimise segment selection over these two spaces to arrive at an optimum segment solution.

Besides answering questions related to use and performance of the network, the system and methods described above may be applied to determining options for stimulating network use or stimulating a change in user behaviour in their use of the network either on a geographic basis or on the basis of user type or category.

The present invention comprises any one feature or method as described above or comprises any combination of the features and methods described above, whether such combination is explicitly described or would be recognised by a person of ordinary skill in the relevant art as a combination of features or methods providing a new and useful result.

The present invention also comprises a system incorporating any one or more of the features and methods described above.

The present invention also comprises a computer program product including software or means for accessing and downloading said software which when installed and executed on a digital processor or an arrangement of digital processors implements any one or more of the features and methods described above.

The present invention also comprises a network management system incorporating any one or more of the features and methods described above, directed to the determination of network configuration, provision or use of a network or to the identification of users or groups of users, whether existing or potential users of the network, whose behaviour in the use of the network or potential use of the network is to be changed.

The invention claimed is:

1. A method of configuring a telecommunications network, the method comprising:
   receiving, by a computing device from a first data store, a set of time dependent network data, a network related parameter varying with time;
   identifying, by the computing device, abnormal data within the set of time dependent network data that is outside a predetermined variation in the set of data;
   receiving, by the computing device from a second data store, a set of external event data indicative of events external to the telecommunications network;
   associating, by the computing device, respective abnormal data with the corresponding external event data;
   generating, by the computing device, a model representing an impact of a class of event represented by the external event data on the telecommunications network;
   using the model in combination with extrapolated data to predict, by the computing device, a future variation in the network related parameter; and
   causing the computing device to reconfigure the network using the future variation in the network related parameter corresponding to the respective set of time dependent network data, the set of external event data, or both.

2. A non-transitory computer program product encoded with instructions that when executed by one or more processors cause a process to be carried out for configuring a telecommunications network, the process comprising:
   receiving, by the one or more processors from a first data store, a set of time dependent network data, a network related parameter varying with time;
   identifying, by the one or more processors, abnormal data within the set of time dependent network data that is outside a predetermined variation in the set of data;
   receiving, by the one or more processors from a second data store, a set of external event data indicative of events external to the telecommunications network;
   associating, by the one or more processors, respective abnormal data with the corresponding external event data;
   generating, by the one or more processors, a model representing an impact of a class of event represented by the external event data on the telecommunications network;
   using the model in combination with extrapolated data to predict, the one or more processors, a future variation in the network related parameter; and
   causing the one or more processors to reconfigure the network using the future variation in the network related parameter corresponding to the respective set of time dependent network data, the set of external event data, or both.

3. A system for configuring a telecommunications network, the system comprising:
   one or more processors configured to
   receive, by the one or more processors from a first data store, a set of time dependent network data, a network related parameter varying with time;
   identify, by the one or more processors, abnormal data within the set of time dependent network data that is outside a predetermined variation in the set of data;
   receive, by the one or more processors from a second data store, a set of external event data indicative of events external to the telecommunications network;
   associate, by the computing device, respective abnormal data with the corresponding external event data;
   generate, by the computing device, a model representing an impact of a class of event represented by the external event data on the telecommunications network;
   use the model in combination with extrapolated data to predict, by the computing device, a future variation in the network related parameter; and
   cause the computing device to reconfigure the network using the future variation in the network related parameter corresponding to the respective set of time dependent network data, the set of external event data, or both.

* * * * *